United States Patent
Chern et al.

(10) Patent No.: US 12,403,071 B2
(45) Date of Patent: Sep. 2, 2025

(54) STORAGE SYSTEM AND METHOD FOR STORING AND TRANSPORTING MEDICAMENT

(71) Applicant: AMGEN INC., Thousand Oaks, CA (US)

(72) Inventors: Rey T. Chern, Thousand Oaks, CA (US); Fanghua Mei, Thousand Oaks, CA (US); Loic Barbedette, Newbury Park, CA (US)

(73) Assignee: AMGEN INC., Thousand Oaks, CA (US)

( * ) Notice: Subject to any disclaimer, the term of this patent is extended or adjusted under 35 U.S.C. 154(b) by 177 days.

(21) Appl. No.: 17/923,688

(22) PCT Filed: May 17, 2021

(86) PCT No.: PCT/US2021/032668
§ 371 (c)(1),
(2) Date: Nov. 7, 2022

(87) PCT Pub. No.: WO2021/236477
PCT Pub. Date: Nov. 25, 2021

(65) Prior Publication Data
US 2023/0172808 A1   Jun. 8, 2023

Related U.S. Application Data

(60) Provisional application No. 63/028,875, filed on May 22, 2020.

(51) Int. Cl.
*A61J 1/16* (2023.01)
*F25D 16/00* (2006.01)

(52) U.S. Cl.
CPC ............. *A61J 1/165* (2013.01); *F25D 16/00* (2013.01); *F25D 2303/082* (2013.01); *F25D 2303/0844* (2013.01)

(58) Field of Classification Search
CPC .... A61J 1/165; F25D 16/00; F25D 2303/082; F25D 2303/084; F25D 2303/0845;
(Continued)

(56) References Cited

U.S. PATENT DOCUMENTS

| | | | |
|---|---|---|---|
| 7,328,583 B2 | 2/2008 | Hillman et al. | |
| 2004/0226309 A1 | 11/2004 | Broussard | |

(Continued)

FOREIGN PATENT DOCUMENTS

| | | | |
|---|---|---|---|
| JP | 2019080858 A | 5/2019 | |
| KR | 101876683 B1 | 7/2018 | |

(Continued)

OTHER PUBLICATIONS

International Search Report and Written Opinion issued to International Application No. PCT/US2021/032668, dated Aug. 17, 2021.
(Continued)

*Primary Examiner* — Frantz F Jules
*Assistant Examiner* — Martha Tadesse
(74) *Attorney, Agent, or Firm* — MARSHALL, GERSTEIN & BORUN LLP; Michael P. Furmanek

(57) ABSTRACT

A storage system for storing a drug includes a container, at least one passive cooling system, and an active cooling system. The container includes an interior volume to accommodate at least one drug. The at least one passive cooling system is disposed within the container and includes a phase change material. The active cooling system is operably coupled with the container and, when in an operational mode, maintains a desired temperature within the interior volume of the container.

21 Claims, 6 Drawing Sheets

(58) Field of Classification Search
CPC ........... F25D 2303/0844; F25D 11/006; F25D 29/003; Y02E 60/14
See application file for complete search history.

(56) References Cited

U.S. PATENT DOCUMENTS

| | | |
|---|---|---|
| 2005/0006272 A1* | 1/2005 | Derifield ............ B65D 81/3827 |
| | | 206/521 |
| 2009/0049845 A1 | 2/2009 | McStravick |
| 2010/0301057 A1* | 12/2010 | Tattam ...................... F25D 3/06 |
| | | 220/592.25 |
| 2013/0008182 A1 | 1/2013 | Hrudka |
| 2015/0143823 A1* | 5/2015 | Slack .................... F25D 11/006 |
| | | 62/3.6 |
| 2016/0243000 A1 | 8/2016 | Gray |
| 2017/0038114 A1 | 2/2017 | Ros |
| 2017/0131015 A1 | 5/2017 | Farrar |
| 2017/0198959 A1 | 7/2017 | Morris |
| 2018/0100682 A1* | 4/2018 | Nilsen ..................... F25D 16/00 |
| 2018/0353379 A1 | 12/2018 | Chou et al. |

FOREIGN PATENT DOCUMENTS

| | | |
|---|---|---|
| WO | WO-2015055836 A1 | 4/2015 |
| WO | WO-2015153607 A1 | 10/2015 |
| WO | WO-2016006490 A1 | 1/2016 |

OTHER PUBLICATIONS

Singapore Patent Application No. 11202254554R, Written Opinion, mailed Nov. 1, 2024.

* cited by examiner

STORAGE SYSTEM AND METHOD FOR STORING AND TRANSPORTING MEDICAMENT

CROSS-REFERENCE TO RELATED APPLICATION

This is the United States national phase of International Patent Application No. PCT/US21/32668, filed May 17, 2021, which claims priority to U.S. Provisional Patent Application No. 63/028,875, filed May 22, 2020, the entire contents of each of which are hereby incorporated by reference herein.

FIELD OF DISCLOSURE

The present disclosure generally relates to drug products and, more particularly, to packaging, storing, and transporting approaches for medicament.

BACKGROUND

Medicaments (also referred to as drugs or pharmaceutical drugs) are administered to treat a variety of conditions and diseases. Many drugs must be kept cold (e.g., at temperatures between approximately 2° C. and approximately 8° C.), frozen, and/or lyophilized (e.g., at temperatures below approximately −20° C.) prior to use to ensure effectiveness of the drug upon administration. Accordingly, these drugs often must remain cold during transportation and distribution. In some environments, drugs may be transported via air freight. Such shipments typically include a passive container cooled by a passive cooling element such as dry ice. Because air freight typically involves relatively smaller volumes of cargo, these shipment systems typically may be loaded and unloaded relatively quickly. Accordingly, the drug may not be exposed to warmer environments such as warehouses where the drug does not receive cooling for extended periods. Accordingly, so long as the passive container is used within the qualified duration of use, the drug may be safely stored and/or transported. However, shipping via air freight may result in increased shipping costs and may not be suitable for larger freight sizes. As another example, shipping via air freight may be difficult to schedule during times of high-demand for flight cargo space. Further, in some scenarios, air freight may involve delays during the loading and/or unloading stages in addition to flight delays, such delays may extend longer than the duration that the passive cooling element may be capable of maintaining reduced temperatures of the drug, and as a result, the drug may be exposed to potentially damaging temperatures.

In other environments, drugs may be transported via ocean freight shipments, where a large quantity of product is placed in a reefer (i.e., refrigerated) containers. These reefer containers may be cooled via active cooling systems that maintain the interior volume of the container at a desired temperature level. Such active cooling systems are typically electrically powered. During the packaging and transporting process, the reefer containers may undergo transition periods when an electrical source is disconnected and/or unavailable. For example, this may occur during packaging, palletizing, labeling, loading, and/or unloading of the reefer container. In these instances, the drug may again be exposed to environmental temperatures where the drug may be at risk of warming to potentially hazardous levels. Further, during shipping, the reefer container may experience an unplanned, unscheduled, or last minute "power off" situation where the active cooling system does not maintain temperatures within the interior volume due to, for example, a loss of electrical power. These situations may also lead to the drug experiencing potentially hazardous environmental temperatures.

As described in more detail below, the present disclosure sets forth systems and methods for storage of drugs embodying advantageous alternatives to existing systems and methods, and that may address one or more of the challenges or needs mentioned herein, as well as provide other benefits and advantages.

SUMMARY

In accordance with a first aspect, a storage system for storing a drug includes a container, at least one passive cooling system, and an active cooling system. The container includes an interior volume to accommodate at least one drug. The at least one passive cooling system is disposed within the container and includes a phase change material. The active cooling system is operably coupled with the container and, when in an operational mode, maintains a desired temperature within the interior volume of the container.

In some examples, the phase change material is transitionable between a solid state and a liquid state. In these examples, the phase change material is configured in the solid state prior to placing the at least one drug within the interior volume of the container.

In some examples, the storage system may additionally include at least one drug container disposed within the interior volume of the container. The at least one drug container is dimensioned to store the at least one drug. Further, in some examples, the at least one drug container may include a number of sidewalls, an upper surface, and a lower surface. The at least one passive cooling system may be operably coupled with at least one of the plurality of sidewalls, the upper surface, or the lower surface. In some examples, the at least one passive cooling system is removably disposed within an opening formed in the at least one drug container. In other forms, the at least one passive cooling system is removably disposed within a pocket formed in the at least one drug container. The pocket may be on an interior and/or an exterior surface of the at least one drug container.

In some examples, the at least one drug container may further include at least one of an expanded polystyrene member or a molded polyurethane member. In some examples, the storage system may transition to a passive cooling state where the at least one passive cooling system maintains a desired temperature within the interior volume of the container. Further in some examples, the storage system may include an electrical connector operably coupled with the active cooling system to provide electrical power thereto.

In accordance with a second aspect, an approach for shipping a drug includes disposing at least one passive cooling system in a container having an interior volume, placing the drug in the interior volume of the container, coupling an active cooling system with the container, and transporting the container to a different location. The at least one passive cooling system includes a phase change material.

BRIEF DESCRIPTION OF THE DRAWINGS

The above needs are at least partially met through provision of the packaging and storage for a drug described in the following detailed description, particularly when studied in conjunction with the drawings, wherein.

Figure 1:
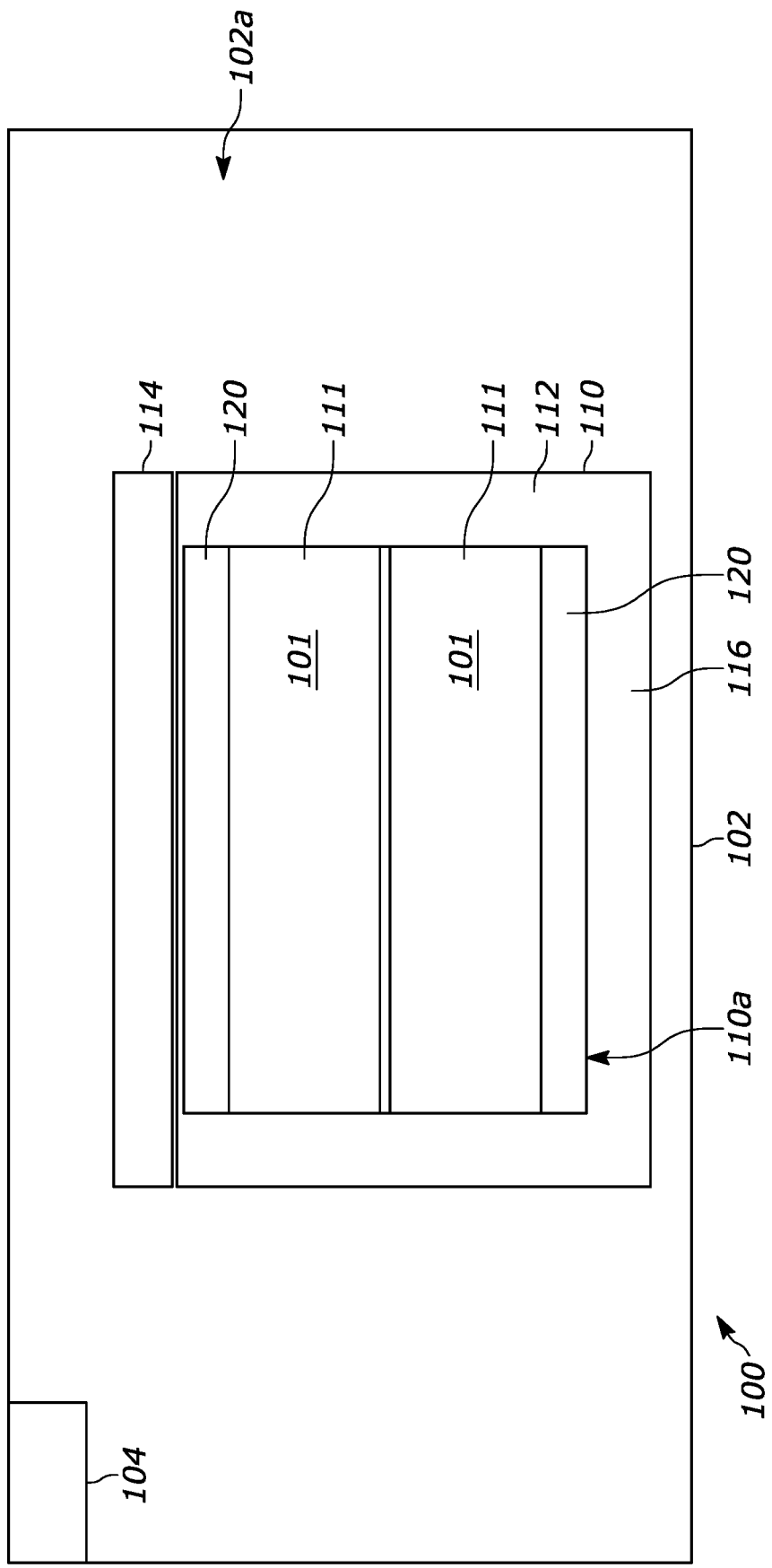
FIG. 1 illustrates a schematic of an example storage system for a drug having an example drug container in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a storage system for storing a drug is provided that uses both passive and active cooling systems to maintain sub-zero temperatures of frozen drugs during loading, unloading, power-off, and other situations encountered during shipping over extended distances and times (e.g., during ocean shipments). The systems and approaches described herein protect against mechanical damage from the moment the drug is placed into the packaging system until the time the drug is moved into a freezer unit at the end of transportation. During the loading, unloading, power-off, and other potential events, it may not be possible to use active cooling mechanisms, and as such, the drug may be exposed to the surrounding room temperature for extended periods of time (e.g., durations of 10 hours or more). If left unprotected during these times, the temperature of the drug could exceed its melting point by the time it is again cooled via an active cooling mechanism.

Turning to the figures, pursuant to these various embodiments, a storage system 100 for storing a drug 101 is provided. The storage system 100 includes a container 102, any number of drug containers or boxes 110, and any number of passive cooling systems 120. The container 102 may be in the form of a cooled and/or refrigerated cargo or shipping container such as a reefer container, and defines an interior volume 102a to receive and store a number of drug containers 110. The container 102 includes an active cooling system 104 which, in some examples, may be a refrigeration or freezer unit, an air compressor, and the like. The container 102 is configured to provide prolonged cooling to the drug container 110 during shipment and transportation by using the active cooling system 104 to maintain temperatures within the interior volume 102a of the container 102. The active cooling system 104 may be coupled with an electrical power connector (not illustrated) to supply power thereto. The container 102 may include any number of coupling mechanisms (not illustrated) to securely retain the drug containers 110.

The drug container 110 includes an interior volume 110a to accommodate at least one drug 101. In the illustrated example, the drug 101 is retained in a drug bag or box 111. The drug container 110 includes a number of sidewalls 112, an upper surface or lid 114, and a lower surface or floor 116. The drug container 110 may be constructed from any number of suitable materials such as, for example, a double-wall corrugated material. Other examples are possible.

The drug container 110 is dimensioned to receive at least one passive cooling system 120. More specifically, the passive cooling system 120 is in the form of a phase change material having a melting point of approximately −23° C. Put differently, the phase change material is transitional between solid and liquid states at this melting point. Generally speaking, when the phase change material is warmed to its melting point, it is configured to absorb energy to provide additional cooling to its surrounding environment (i.e., the drug container 110). The passive cooling system 120 may be contained in a plastic housing or other material in the form of a pouch or brick, and is arranged in a generally flat panel or sheet. In the illustrated example of FIGS. 1 and 2, the passive cooling system 120 is placed adjacent to the lower surface 116 and the upper surface 114 of the drug container 110. However, in other examples, and as will be discussed in further detail below, the passive cooling system 120 may be positioned in a number of configurations relative to the drug container 110.

Figure 2:
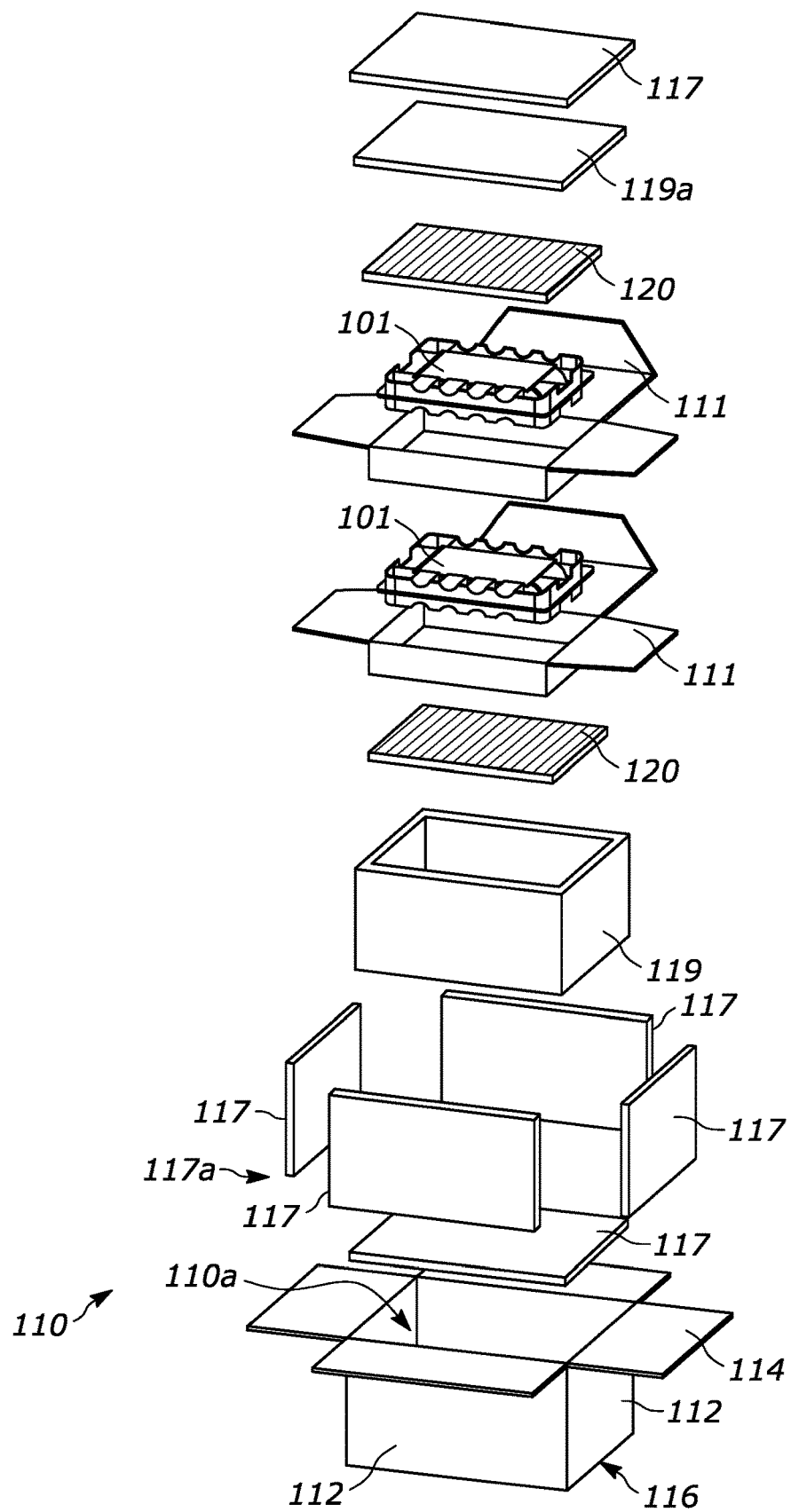
FIG. 2 illustrates a perspective view of the example drug container of FIG. 1 in accordance with various embodiments.

With reference to FIG. 2, a more detailed illustration of the drug container 110 and packaging steps is provided. The drug container 110 may include any number of additional insulative layers to provide additional protection to the drug 101. More specifically, a number of expanded polystyrene panels 117 may cooperate to form an inner box 117a disposed within the interior volume 110a of the drug container 110, and a molded polyurethane tub 119 may be disposed within the inner box 117a. In the illustrated example of FIG. 2, a first passive cooling system 120 is then disposed within the molded polyurethane tub 119. Notably, in some examples, the phase change material of the passive cooling system 120 is initially configured in the solid (i.e., frozen) state prior to packaging such that when the drug 101 is packaged in the drug box 111 and placed onto the passive cooing system 120, the passive cooling system 120 may immediately provide cooling to the drug 101 to maintain low temperatures.

As illustrated in FIG. 2, a second drug box 111 retains additional drug 101 and is then placed on top of the first drug box 111. Next, a second passive cooling system 120 is placed on top of the second drug box 111, and a molded polyurethane lid 119a is placed on the molded polyurethane tub 119. An additional expanded polystyrene panel 117 is then placed on the polyurethane lid 119a, and the upper surface 114 of the drug container 110 may be folded over the expanded polystyrene panel 117 and secured to close the drug container 110. Any number of these drug containers 110 may be packaged and assembled and loaded into the container 102 and subsequently shipped or transported to desired locations.

Figure 3:
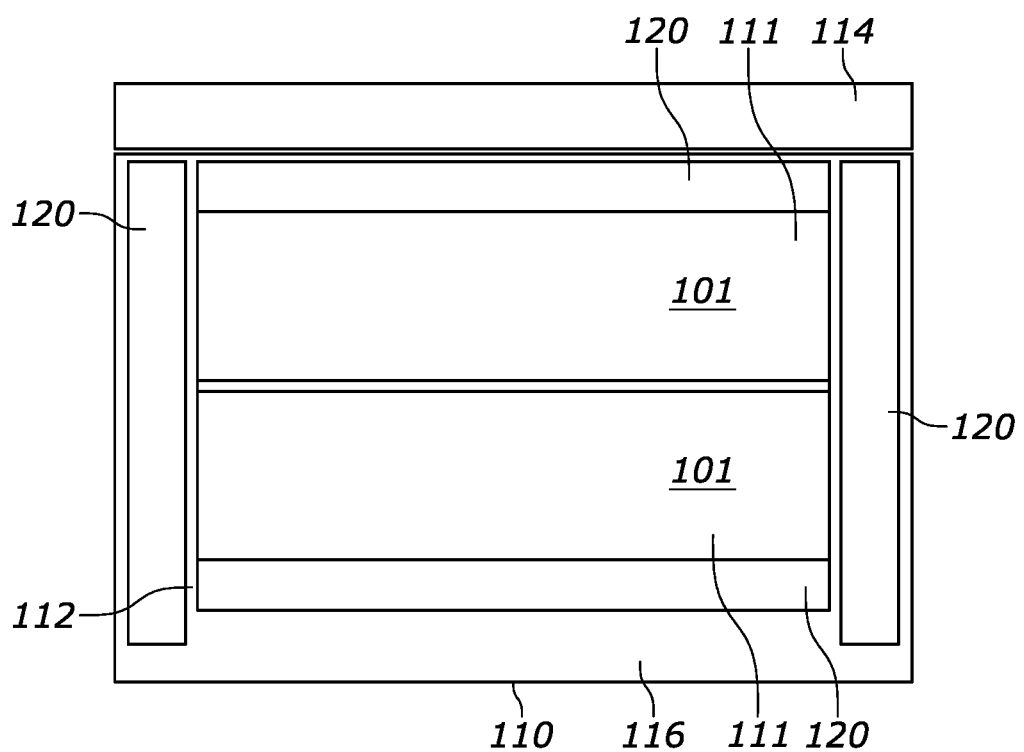
FIG. 3 illustrates a schematic of the example drug container of FIGS. 1 and 2 accommodating additional passive cooling systems in accordance with various embodiments.
Figure 4:
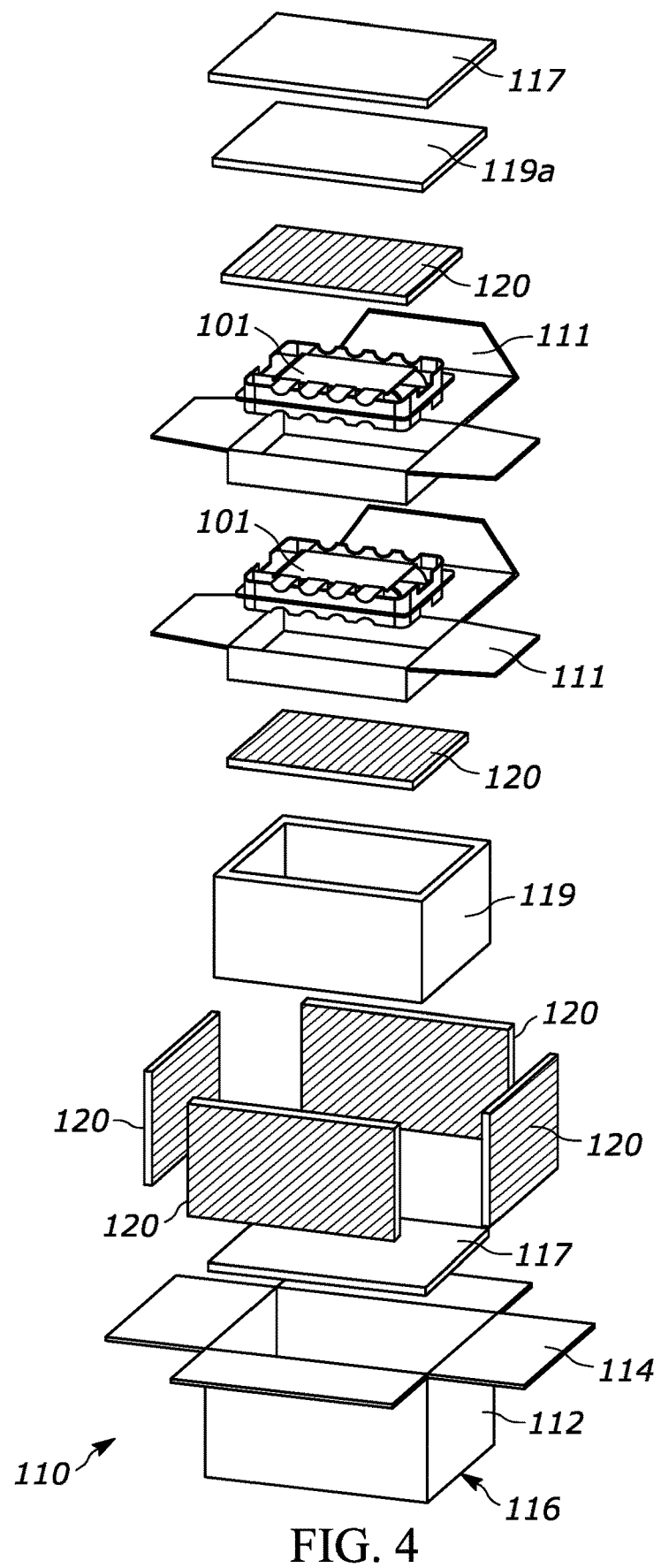
FIG. 4 illustrates a perspective view of the example drug container of FIG. 3 in accordance with various embodiments.

With brief reference to FIGS. 3 and 4, additional passive cooling systems 120 are positioned within the drug container 110 against the sidewalls 112 in place of the expanded polystyrene panels 117. In this arrangement, the drug container 110 may receive additional cooling of the drug 101 if needed.

In typical operation, during shipping and transport of the drug 101, the active cooling system 104, in an operational mode, maintains a desired temperature within the interior volume 102a of the container 102. Accordingly, the drug 101 (in addition to the phase change material), remain frozen and in a solid state. However, in the event that the storage system 100 transitions to a passive cooling state where the active cooling system 104 is not operational (e.g., during a power off situation or during loading and/or unloading), the passive cooling system 120 will maintain the temperature within the interior volume 102a of the container 102 for an extended duration. The passive cooling system 120 may maintain lowered temperatures for extended periods of time such as, for example, between approximately 10 and approximately 30 hours before the phase change material melts and is no longer capable of maintaining the desired temperature for the drug 101. As other examples, the passive cooling system 120 may maintain the desired temperature for between approximately 12 and approximately 28 hours, or between approximately 14 and approximately 26 hours, or between approximately 16 and approximately 24 hours, or between approximately 18 and approximately 22 hours, or for other exemplary time periods. If, during these passive cooling states, the active cooling system 104 regains power and returns to the operational state, the active cooling system 104 will again maintain temperatures within the interior volume 102a of the container 102, while also causing the phase change material of the passive cooling system 120 to absorb cooling energy and return to the solid state and/or its full cooling potential.

Figure 6:
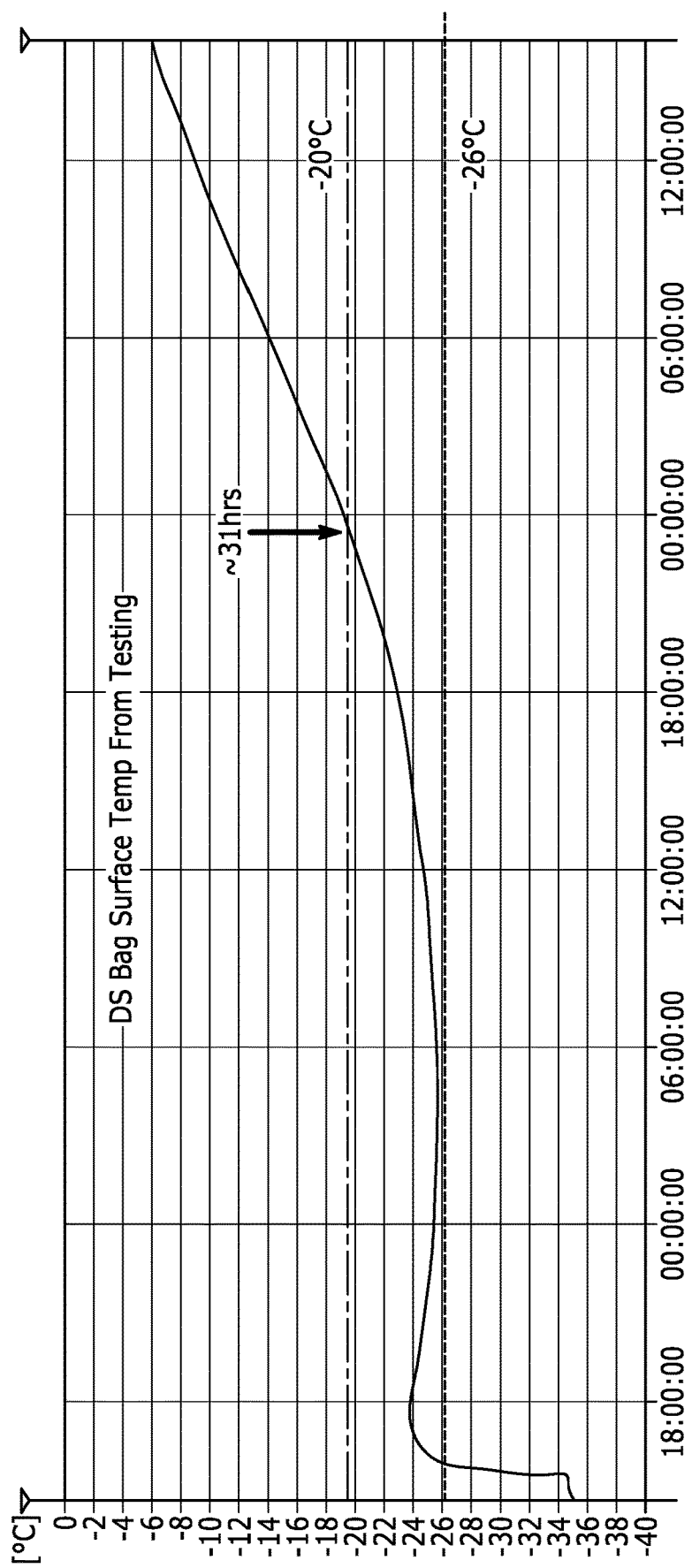
FIG. 6 illustrates a graph depicting surface temperatures of a drug being stored in an example drug container over time in accordance with various embodiments.

As previously noted, the passive cooling system 120 may continually keep the drug 101 below its melting temperature. As illustrated in FIG. 6, in the event the external environment raises to room temperature (e.g., during loading, unloading, or power-out situations), the phase change material of the passive cooling system 120 absorbs energy in the form of heat and in turn provides cooling to the drug 101. In examples where additional passive cooling systems 120 are used, the interior volume 110a of the drug container 110 may remain below the melting point for the drug 101 for approximately 72 hours or more. Other examples are possible.

Advantageously, the passive cooling system may be "recharged" by the active cooling system 104. Accordingly, the passive cooling system 120 may be used a number of times without experiencing notable degradation.

Notably, in some examples, by providing the phase change material in the solid state during packaging, the drug container 110 needn't be immediately placed in the container 102. Rather, any or all of the desired drug containers 110 may be assembled without concern that the drug 101 may melt prior to being loaded into the container 102. Further, upon the system 100 arriving at a desired location, the drug containers 110 may be unloaded from the containers 102 and moved to a temporary holding location (e.g., a dock, a warehouse, etc.) prior to again being placed in a freezer or cold room. During this time, the passive cooling system 120 again serves to maintain lowered temperatures of the drug 101.

Figure 5:
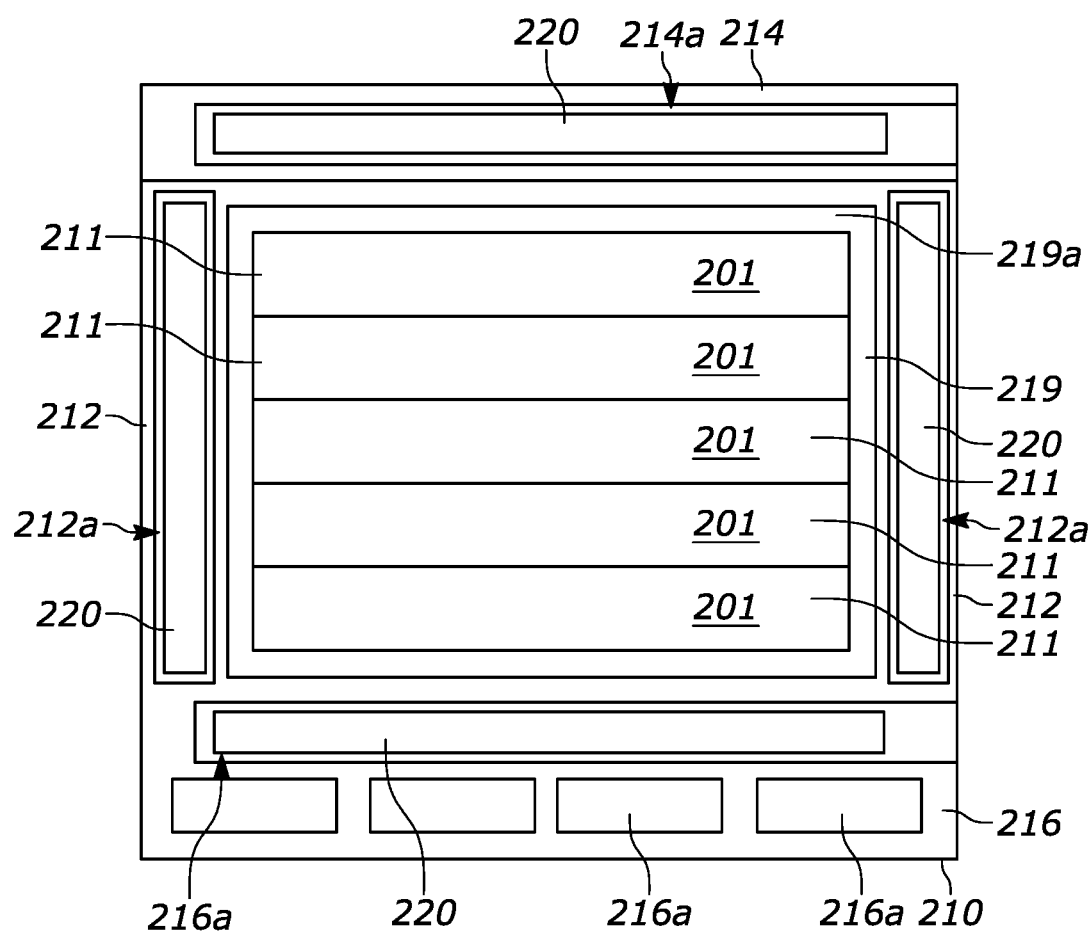
FIG. 5 illustrates a schematic of a second example storage system for a drug having an example drug container in accordance with various embodiments.

The storage system 100 may be provided with any number of alternative designs, features, and/or additional components. For example, with reference to FIG. 5, a second example drug container 210 is provided that may be used with the system 100. It is appreciated that the drug container 210 may include similar features as the drug container 110, and as such, these similar features are denoted by reference characters having identical two-digit suffixes. Accordingly, such components will not be described in substantial detail with reference to the drug container 210. Further, any of the components of the drug container 210 may be used interchangeably with any components of the drug container 110.

In the drug container 210, any number of the sidewalls 212, the upper surface 214, and/or the lower surface 216 may include an opening or openings 212a, 214a, 216a, respectively dimensioned to receive the passive cooling system 220. Further, as illustrated in the lower surface 216, a number of openings 216a may be provided to receive multiple, discrete passive cooling systems 220. Alternatively, the openings 216a on the lower surface may be used for transportation. More specifically, the openings 216a may be dimensioned to receive forks from a forklift or similar component. Other examples are possible.

In some examples, the passive cooling system needn't be coupled directly with a drug container. More specifically, any number of passive cooling systems may be disposed within the interior volume 102a of the container 102 in any number of arrangements such as, for example, in cooling packs disposed along a perimeter of the interior volume, coupled to the sidewalls to form a shell, and the like. Further, in some examples, the passive cooling system may be coupled directly with the drug without using a drug container. In these examples, the passive cooling system itself may function as a container, and may be secured via fasteners, straps, buckles, and the like. Other examples are possible.

So configured, the container, by incorporating a phase change material into the passive cooling system or systems, the drug may safely remain below its freezing temperature. Further, the phase change material allows the drug temperature to quickly equilibrate to container temperature after being placed therein. More specifically, because palletizing, labeling, and loading the drug containers into the container may take extended periods of time (e.g., several hours), the interior volume of the container will also require an extended amount of time to be actively cooled to the desired temperature. By using a phase change material in its solid state in the drug container, the interior volume of the container will initially have a lowered temperature, and thus, when activated, the active cooling system may more quickly lower the temperature of the internal volume of the container. Any number of passive cooling systems may be used and arranged on any sides of the drug container depending on cooling requirements for the drug container. Further, the passive cooling systems may be disposed outside of the drug container by way of external pockets positioned on the sidewalls, upper surface, and/or lower surface, or by simply abutting an exterior surface of the desired container wall.

It will be appreciated that the systems and approaches described herein may be used for the storage and transport of drugs in various states, such as but not limited to drug products which have undergone completion of mixing and/or other finishing steps, drug substances which are intended to be mixed and/or finished after shipping, components or ingredients to be used in a drug, or other drug-related states or components.

The above description describes various devices, assemblies, components, subsystems and methods for use related to a drug delivery device. The devices, assemblies, components, subsystems, methods or drug delivery devices can further comprise or be used with a drug including but not limited to those drugs identified below as well as their generic and biosimilar counterparts. The term drug, as used herein, can be used interchangeably with other similar terms and can be used to refer to any type of medicament or therapeutic material including traditional and non-traditional pharmaceuticals, nutraceuticals, supplements, biologics, biologically active agents and compositions, large molecules, biosimilars, bioequivalents, therapeutic antibodies, polypeptides, proteins, small molecules and generics. Non-therapeutic injectable materials are also encompassed. The drug may be in liquid form, a lyophilized form, or in a reconstituted from lyophilized form. The following example list of drugs should not be considered as all-inclusive or limiting.

The drug will be contained in a reservoir. In some instances, the reservoir is a primary container that is either filled or pre-filled for treatment with the drug. The primary container can be a vial, a cartridge, a carboy, a bag, a pre-filled syringe, or any suitable drug container, drug product container, drug substance container, or other drug-related container.

In some embodiments, the reservoir of the drug delivery device may be filled with or the device can be used with colony stimulating factors, such as granulocyte colony-stimulating factor (G-CSF). Such G-CSF agents include but are not limited to Neulasta® (pegfilgrastim, pegylated filgastrim, pegylated G-CSF, pegylated hu-Met-G-CSF) and Neupogen® (filgrastim, G-CSF, hu-MetG-CSF).

In other embodiments, the drug delivery device may contain or be used with an erythropoiesis stimulating agent (ESA), which may be in liquid or lyophilized form. An ESA is any molecule that stimulates erythropoiesis. In some embodiments, an ESA is an erythropoiesis stimulating protein. As used herein, "erythropoiesis stimulating protein" means any protein that directly or indirectly causes activation of the erythropoietin receptor, for example, by binding to and causing dimerization of the receptor. Erythropoiesis stimulating proteins include erythropoietin and variants, analogs, or derivatives thereof that bind to and activate erythropoietin receptor; antibodies that bind to erythropoietin receptor and activate the receptor; or peptides that bind to and activate erythropoietin receptor. Erythropoiesis stimulating proteins include, but are not limited to, Epogen® (epoetin alfa), Aranesp® (darbepoetin alfa), Dynepo® (epoetin delta), Mircera® (methyoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin iota, epoetin omega, epoetin delta, epoetin zeta, epoetin theta, and epoetin delta, pegylated erythropoietin, carbamylated erythropoietin, as well as the molecules or variants or analogs thereof.

Among particular illustrative proteins are the specific proteins set forth below, including fusions, fragments, analogs, variants or derivatives thereof: OPGL specific antibodies, peptibodies, related proteins, and the like (also referred to as RANKL specific antibodies, peptibodies and the like), including fully humanized and human OPGL specific antibodies, particularly fully humanized monoclonal antibodies; Myostatin binding proteins, peptibodies, related proteins, and the like, including myostatin specific peptibodies; IL-4 receptor specific antibodies, peptibodies, related proteins, and the like, particularly those that inhibit activities mediated by binding of IL-4 and/or IL-13 to the receptor; Interleukin 1-receptor 1 ("IL1-R1") specific antibodies, peptibodies, related proteins, and the like; Ang2 specific antibodies, peptibodies, related proteins, and the like; NGF specific antibodies, peptibodies, related proteins, and the like; CD22 specific antibodies, peptibodies, related proteins, and the like, particularly human CD22 specific antibodies, such as but not limited to humanized and fully human antibodies, including but not limited to humanized and fully human monoclonal antibodies, particularly including but not limited to human CD22 specific IgG antibodies, such as, a dimer of a human-mouse monoclonal hLL2 gamma-chain disulfide linked to a human-mouse monoclonal hLL2 kappa-chain, for example, the human CD22 specific fully humanized antibody in Epratuzumab, CAS registry number 501423-23-0; IGF-1 receptor specific antibodies, peptibodies, and related proteins, and the like including but not limited to anti-IGF-1R antibodies; B-7 related protein 1 specific antibodies, peptibodies, related proteins and the like ("B7RP-1" and also referring to B7H2, ICOSL, B7h, and CD275), including but not limited to B7RP-specific fully human monoclonal IgG2 antibodies, including but not limited to fully human IgG2 monoclonal antibody that binds an epitope in the first immunoglobulin-like domain of B7RP-1, including but not limited to those that inhibit the interaction of B7RP-1 with its natural receptor, ICOS, on activated T cells; IL-15 specific antibodies, peptibodies, related proteins, and the like, such as, in particular, humanized monoclonal antibodies, including but not limited to HuMax IL-15 antibodies and related proteins, such as, for instance, 146B7; IFN gamma specific antibodies, peptibodies, related proteins and the like, including but not limited to human IFN gamma specific antibodies, and including but not limited to fully human anti-IFN gamma antibodies; TALL-1 specific antibodies, peptibodies, related proteins, and the like, and other TALL specific binding proteins; Parathyroid hormone ("PTH") specific antibodies, peptibodies, related proteins, and the like; Thrombopoietin receptor ("TPO-R") specific antibodies, peptibodies, related proteins, and the like; Hepatocyte growth factor ("HGF") specific antibodies, peptibodies, related proteins, and the like, including those that target the HGF/SF:cMet axis (HGF/SF:c-Met), such as fully human monoclonal antibodies that neutralize hepatocyte growth factor/scatter (HGF/SF); TRAIL-R2 specific antibodies, peptibodies, related proteins and the like; Activin A specific antibodies, peptibodies, proteins, and the like; TGF-beta specific antibodies, peptibodies, related proteins, and the like; Amyloid-beta protein specific antibodies, peptibodies, related proteins, and the like; c-Kit specific antibodies, peptibodies, related proteins, and the like, including but not limited to proteins that bind c-Kit and/or other stem cell factor receptors; OX40L specific antibodies, peptibodies, related proteins, and the like, including but not limited to proteins that bind OX40L and/or other ligands of the OX40 receptor; Activase® (alteplase, tPA); Aranesp® (darbepoetin alfa); Epogen® (epoetin alfa, or erythropoietin); GLP-1, Avonex® (interferon beta-1a); Bexxar® (tositumomab, anti-CD22 monoclonal antibody); Betaseron® (interferon-beta); Campath® (alemtuzumab, anti-CD52 monoclonal antibody); Dynepo® (epoetin delta); Velcade® (bortezomib); MLN0002 (anti-α4ß7 mAb); MLN1202 (anti-CCR2 chemokine receptor mAb); Enbrel® (etanercept, TNF-receptor/Fc fusion protein, TNF blocker); Eprex® (epoetin alfa); Erbitux® (cetuximab, anti-EGFR/HER1/c-ErbB-1); Genotropin® (somatropin, Human Growth Hormone); Herceptin® (trastuzumab, anti-HER2/neu (erbB2) receptor mAb); Humatrope® (somatropin, Human Growth Hormone); Humira® (adalimumab); Vectibix® (panitumumab), Xgeva® (denosumab), Prolia® (denosumab), Enbrel® (etanercept, TNF-receptor/Fc fusion protein, TNF blocker), Nplate® (romiplostim), rilotumumab, ganitumab, conatumumab, brodalumab, insulin in solution; Infergen® (interferon alfacon-1); Natrecor® (nesiritide; recombinant human B-type natriuretic peptide (hBNP); Kineret® (anakinra); Leukine® (sargamostim, rhuGM-CSF); LymphoCide® (epratuzumab, anti-CD22 mAb); Benlysta™ (lymphostat B, belimumab, anti-BlyS mAb); Metalyse® (tenecteplase, t-PA analog); Mircera® (methoxy polyethylene glycol-epoetin beta); Mylotarg® (gemtuzumab ozogamicin); Raptiva® (efalizumab); Cimzia® (certolizumab pegol, CDP 870); Soliris™ (eculizumab); pexelizumab (anti-C5 complement); Numax® (MEDI-524); Lucentis® (ranibizumab); Panorex® (17-1A, edrecolomab); Trabio® (lerdelimumab); TheraCim hR3 (nimotuzumab); Omnitarg (pertuzumab, 2C4); Osidem® (IDM-1); OvaRex® (B43.13); Nuvion® (visilizumab); cantuzumab mertansine (huC242-DM1); NeoRecormon® (epoetin beta); Neumega® (oprelvekin, human interleukin-11); Orthoclone OKT3® (muromonab-CD3, anti-CD3 monoclonal antibody); Procrit® (epoetin alfa); Remicade® (infliximab, anti-TNFα monoclonal antibody); Reopro® (abciximab, anti-GP IIb/IIIa receptor monoclonal antibody); Actemra® (anti-IL6 Receptor mAb); Avastin® (bevacizumab), HuMax-CD4 (zanolimumab); Rituxan® (rituximab, anti-CD20 mAb); Tarceva® (erlotinib); Roferon-A®-(interferon alfa-2a); Simulect® (basiliximab); Prexige® (lumiracoxib); Synagis® (palivizumab); 146B7-CHO (anti-IL15 antibody, see U.S. Pat. No. 7,153,507); Tysabri® (natalizumab, anti-α4integrin mAb); Valortim® (MDX-1303, anti-*B. anthracis* protective antigen mAb); ABthrax™; Xolair® (omalizumab); ETI211 (anti-MRSA mAb); IL-1 trap (the Fc portion of human IgG1 and the extracellular domains of both IL-1 receptor components (the Type I receptor and receptor accessory protein)); VEGF trap (Ig domains of VEGFR1 fused to IgG1 Fc); Zenapax® (daclizumab); Zenapax® (daclizumab, anti-IL-2Rα mAb); Zevalin® (ibritumomab tiuxetan); Zetia® (ezetimibe); Orencia® (atacicept, TACI-Ig); anti-CD80 monoclonal antibody (galiximab); anti-CD23 mAb (lumiliximab); BR2-Fc (huBR3/huFc fusion protein, soluble BAFF antagonist); CNTO 148 (golimumab, anti-TNFα mAb); HGS-ETR1 (mapatumumab; human anti-TRAIL Receptor-1 mAb); HuMax-CD20 (ocrelizumab, anti-CD20 human mAb); HuMax-EGFR (zalutumumab); M200 (volociximab, anti-α5β1 integrin mAb); MDX-010 (ipilimumab, anti-CTLA-4 mAb and VEGFR-1 (IMC-18F1); anti-BR3 mAb; anti-*C. difficile* Toxin A and Toxin B C mAbs MDX-066 (CDA-1) and MDX-1388); anti-CD22 dsFv-PE38 conjugates (CAT-3888 and CAT-8015); anti-CD25 mAb (HuMax-TAC); anti-CD3 mAb (NI-0401); adecatumumab; anti-CD30 mAb (MDX-060); MDX-1333 (anti-IFNAR); anti-CD38 mAb (HuMax CD38); anti-CD40L mAb; anti-Cripto mAb; anti-CTGF Idiopathic Pulmonary Fibrosis Phase I Fibrogen (FG-3019); anti-CTLA4 mAb; anti-eotaxin1 mAb (CAT-213); anti-FGF8 mAb; anti-ganglioside GD2 mAb; anti-ganglioside GM2 mAb; anti-GDF-8 human mAb (MYO-029); anti-GM-CSF Receptor mAb (CAM-3001); anti-HepC mAb (HuMax HepC); anti-IFNα mAb (MEDI-545, MDX-1103); anti-IGF1R mAb; anti-IGF-1R mAb (HuMax-Inflam); anti-IL12 mAb (ABT-874); anti-IL12/IL23 mAb (CNTO 1275); anti-IL13 mAb (CAT-354); anti-IL2Ra mAb (HuMax-TAC); anti-IL5 Receptor mAb; anti-integrin receptors mAb (MDX-018, CNTO 95); anti-IP10 Ulcerative Colitis mAb (MDX-1100); BMS-66513; anti-Mannose Receptor/hCGβ mAb (MDX-1307); anti-mesothelin dsFv-PE38 conjugate (CAT-5001); anti-PD1mAb (MDX-1106 (ONO-4538)); anti-PDGFRα antibody (IMC-3G3); anti-TGFß mAb (GC-1008); anti-TRAIL Receptor-2 human mAb (HGS-ETR2); anti-TWEAK mAb; anti-VEGFR/Flt-1 mAb; and anti-ZP3 mAb (HuMax-ZP3).

In some embodiments, the drug delivery device may contain or be used with a sclerostin antibody, such as but not limited to romosozumab, blosozumab, or BPS 804 (Novartis) and in other embodiments, a monoclonal antibody (IgG) that binds human Proprotein Convertase Subtilisin/Kexin Type 9 (PCSK9). Such PCSK9 specific antibodies include, but are not limited to, Repatha® (evolocumab) and Praluent® (alirocumab). In other embodiments, the drug delivery device may contain or be used with rilotumumab, bixalomer, trebananib, ganitumab, conatumumab, motesanib diphosphate, brodalumab, vidupiprant or panitumumab. In some embodiments, the reservoir of the drug delivery device may be filled with or the device can be used with IMLYGIC® (talimogene laherparepvec) or another oncolytic HSV for the treatment of melanoma or other cancers including but are not limited to OncoVEXGALV/CD; OrienX010; G207, 1716; NV1020; NV12023; NV1034; and NV1042. In some embodiments, the drug delivery device may contain or be used with endogenous tissue inhibitors of metalloproteinases (TIMPs) such as but not limited to TIMP-3. Antagonistic antibodies for human calcitonin gene-related peptide (CGRP) receptor such as but not limited to erenumab and bispecific antibody molecules that target the CGRP receptor and other headache targets may also be delivered with a drug delivery device of the present disclosure. Additionally, bispecific T cell engager (BITE®) antibodies such as but not limited to half-life extended BiTEs that include an antibody Fc region, BLINCYTO® (blinatumomab) can be used in or with the drug delivery device of the present disclosure. In some embodiments, the drug delivery device may contain or be used with an APJ large molecule agonist such as but not limited to apelin or analogues thereof. In some embodiments, a therapeutically effective amount of an anti-thymic stromal lymphopoietin (TSLP) or TSLP receptor antibody is used in or with the drug delivery device of the present disclosure.

Although the drug delivery devices, assemblies, components, subsystems and methods have been described in terms of exemplary embodiments, they are not limited thereto. The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. A storage system for storing a drug, the storage system comprising:
    a shipping container including an interior volume;
    a drug container including a number of sidewalls, an upper surface, and a lower surface that define an interior volume to accommodate at least one drug, the lower surface including a plurality of transportation openings defined by an opening ceiling, an opening floor surface, and a plurality of opening sidewalls, the plurality of transportation openings dimensioned to receive a lifting member of a forklift, the drug container adapted to be disposed within the shipping container;
    at least one passive cooling system selectively disposed within the interior volume of the drug container or at least one of the plurality of transportation openings such that the at least one passive cooling system rests on the opening floor surface thereof, the at least one passive cooling system including a phase change material; and
    an active cooling system operably coupled with the shipping container and, when in an operational mode, adapted to maintain a desired temperature within the interior volume of the shipping container.

2. The storage system of claim 1, wherein the phase change material is transitionable between a solid state and a liquid state.

3. The storage system of claim 2, wherein the phase change material is configured in the solid state prior to placing the at least one drug within the interior volume of the drug container.

4. The storage system of claim 1, further comprising at least one additional drug container adapted to be disposed within the interior volume of the shipping container.

5. The storage system of claim 1, wherein the at least one passive cooling system is operably coupled with at least one of the plurality of sidewalls, the upper surface, or the lower surface.

6. The storage system of claim 5, wherein the at least one passive cooling system is removably disposed within an opening or a pocket formed in the drug container.

7. The storage system of claim 6, wherein the at least one passive cooling system is removably disposed within the pocket formed in the drug container, and the pocket is formed on at least one of an interior surface of the at least one drug container or an exterior surface of the at least one drug container.

8. The storage system of claim 1, wherein the at least one drug container further includes at least one of an expanded polystyrene member or a molded polyurethane member.

9. The storage system of claim 1, wherein the storage system is further configured to transition to a passive cooling state whereby the at least one passive cooling system maintains a desired temperature within the interior volume of the drug container.

10. The storage system of claim 1, further including an electrical connector operably coupled with the active cooling system to provide electrical power thereto.

11. A method of shipping a drug, the method comprising:
    providing a drug container having a number of sidewalls, an upper surface, and a lower surface that define an interior volume, the lower surface including a plurality of transportation openings defined by an opening ceiling, an opening floor surface, and a plurality of opening sidewalls, the plurality of transportation openings dimensioned to receive a lifting member of a forklift, the at least one passive cooling system including a phase change material;
    selectively disposing at least one passive cooling system in at least one of the interior volume of the drug container or at least one of the plurality of transportation openings such that the at least one passive cooling system rests on the opening floor surface thereof;
    placing the drug in the interior volume of the drug container;
    transporting, via a lifting member of a forklift engaged with the plurality of transportation openings, the drug container to a shipping container;
    coupling an active cooling system with the shipping container; and
    transporting the shipping container to a different location.

12. The method of claim 11, wherein the phase change material is transitionable between a solid state and a liquid state.

13. The method of claim 12, wherein the phase change material is configured in the solid state prior to placing the drug within the interior volume of the drug container.

14. The method of claim 11, further comprising cooling, via the active cooling system, the drug container prior to placing the drug into the interior volume thereof.

15. The method of claim 11, wherein the at least one passive cooling system is coupled with at least one of the plurality of sidewalls, the upper surface, or the lower surface.

16. The method of claim 15, wherein the step of coupling at least one passive cooling system with the drug container includes removably disposing the at least one passive cooling system within an opening or a pocket formed in the drug container.

17. The method of claim 16, wherein the at least one passive cooling system is removably disposed with the pocket formed in the drug container, and the pocket is formed on at least one of an interior surface of the drug container or an exterior surface of the drug container.

18. The method of claim 11, further including disposing at least one of an expanded polystyrene member or a molded polyurethane member in the drug container.

19. The method of claim 11, further comprising transitioning to a passive cooling state whereby the at least one passive cooling system maintains a desired temperature within the interior volume of the drug container.

20. The storage system of claim 1, further comprising the at least one drug in the interior volume of the drug container, the at least one drug comprising a drug product or a drug substance.

21. The method of claim 11, wherein placing the drug in the interior volume of the drug container comprises placing a drug product or a drug substance in the interior volume of the drug container.

* * * * *